March 16, 1943.   E. FAIRCLOUGH   2,314,203
BATTERY SEPARATOR
Filed Aug. 1, 1941
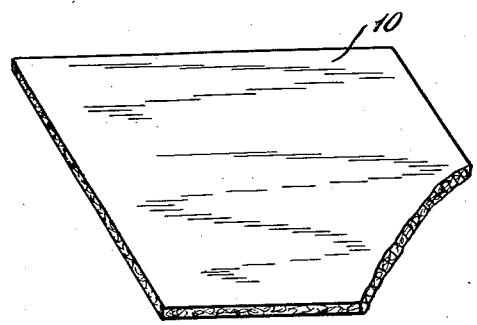
FIG. 1
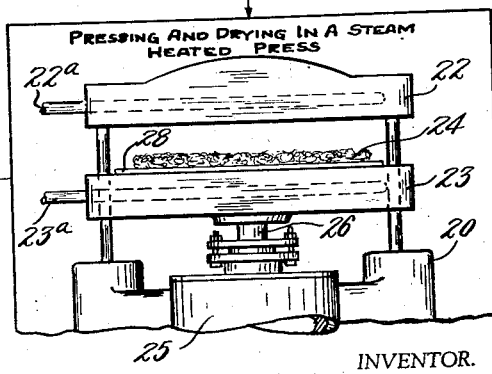
INVENTOR.
EDWARD FAIRCLOUGH
BY Kwis Hudson & Kent
ATTORNEYS Patented Mar. 16, 1943

2,314,203

UNITED STATES PATENT OFFICE 2,314,203

BATTERY SEPARATOR

Edward Fairclough, Cleveland, Ohio, assignor to Willard Storage Battery Company, Cleveland, Ohio, a corporation of West Virginia Application August 1, 1941, Serial No. 405,062

6 Claims. (Cl. 136—149)

This invention relates to battery separators and their manufacture, and as one of its objects, aims to provide an improved battery separator made from tree bark fibers.

Another object is to provide an improved storage battery separator made of matted redwood bark fibers.

Still another object of this invention is to provide a battery separator made of tree bark fibers and a binder.

A further object of the invention is to provide an improved storage battery separator made of redwood bark fibers and a binder.

Other objects and advantages of the invention will be apparent from the following description and the accompanying drawing in which:

Fig. 1 is a perspective view partly in section showing a storage battery separator made of matted tree bark fibers; and Fig. 2 is a view more or less diagrammatic in form and indicating process steps and apparatus used in the manufacture of my improved separator.

In Fig. 1 I show a separator 10 for use between the adjacent positive and negative plates of a storage battery and which is in the form of a sheet made of matted tree bark fibers. The separator may be of size and thickness suitable for the battery in which the separator is to be used. In making the separator 10 I prefer to use bark fibers obtained from trees of the Sequoia group such as the redwood trees because the fibers obtained from the bark of these trees are relatively long and possess other desirable characteristics, but I may use fibers obtained from the bark of various other trees if the fibers are of suitable length.

In forming the separator the fibers are matted together and pressed into a sheet, and although the fibers do have sufficient adhesive qualities to permit such separators to be successfully produced without the use of a binder, I prefer to use a binder to aid in keeping the fibers from falling apart. Any suitable substance may be used as a binder such as latex, hard rubber dust, or asphalt. I find that a natural asphalt known as "gilsonite" forms a very satisfactory binder and that certain resins also make satisfactory binders providing they are acid resistant and do not introduce any undesirable matter into the electrolyte solution. Gilsonite is a variety of natural asphalt found in the Uinta Valley, Utah, and occurring generally as rounded masses of brilliant black solid hydrocarbon. One such resin is a pine resin known commercialy as "Vinsol." When a binder, of the kind already mentioned, is employed it should be used in a relatively small amount so as not to interfere with or detract from the absorbent qualities of the separator. In some instances it may be desirable to add jute fibers or other vegetable or mineral fibers to the tree bark fibers, instead of one of the above-mentioned binders, to give the separators initial strength so that they can be handled satisfactorily.

I have found the fibers obtained from the bark of redwood trees to be especially suitable for making battery separators because they are relatively long fibers which will form a good mat without the use of any binder whatever, particularly after the caustic treatment hereinafter described, and will form an excellent mat with only a limited amount of binder. The redwood bark fibers also have a high lignin content which not only adds to the life of the separator and makes it resistant to acid but is known to be a desirable substance in a storage battery because it tends to prolong the life of the battery and enables it to maintain a favorable capacity rating. The redwood bark fibers have a desired resiliency, probably because of their crinkly character and when incorporated in a battery separator, cause the separator to swell or expand and maintain contact with the positive plate so as to prevent loosening or shedding of the active material. Another desirable characteristic of the redwood bark fibers is that they do not hydrolyze appreciably in acid. Various materials, particularly cellulose, tend to lose their strength and resiliency in acid, but redwood bark fibers contain a relatively small amount of cellulose and probably for this reason possess the quality of resisting hydrolysis. I also find that battery separators made from redwood bark fibers have a satisfactory low electrical resistance.

In making storage battery separators from redwood bark or other suitable tree bark, the bark is stripped from the tree, chopped into pieces of convenient size, and passed through a shredding apparatus which liberates the fibers. The shredded material is cleaned as by screening or any other suitable operation to separate the fibers from the dust, dirt, and other matter. The shredding and separation of the fibers from the other matter are preferably carried out with the material in a dry or natural state. The bark fibers thus obtained are relatively long and more or less round and crinkly in form.

The bark fibers are then subjected to a treatment in a caustic solution which removes various impurities such as resins, miscellaneous organic material, small amounts of manganese, and various other ingredients that would prove harmful to storage battery plates. In carrying out this treatment, the bark fibers may be placed in a filter vessel or container, which may be cheese-cloth and which retains the fibers and permits the treating liquid to circulate through the mass. While the fibers are retained in the filter vessel or container they are subjected to cooking in a 1% or 1½% caustic solution (sodium hydroxide) at a temperature of about 190° or 200° F. The fibers are usually left in the caustic solution for a period of one to four hours, although the time of treatment may be greater or less than this, depending upon the character of the fibers, and are then removed and thoroughly washed to get rid of the caustic solution. This caustic treatment apparently removes very little, if any, of the cellulose from the fibers, although the treatment may reduce the weight of the fibers by approximately 25% or 30%.

The washed fibers are next placed in a mixer together with a wetting or foaming agent and the desired binding material, if one is to be used. The fibers may be dried before being placed in the mixer or may be placed therein in the wet condition in which they come from the washing operation following the caustic treatment. The wetting agent should be a substance which will wet the fibers individually and will also produce a foam so that the fibers will separate or be held apart and will not remain in lumps or clots. Although various substances can be used for this purpose, those compounds or salts chemically known as soaps and those chemically known as foam producing wetting agents are preferred. An ordinary soap solution can also be used as the wetting agent, but I prefer to use a commercially available material of the kind which consists of sodium salts of sulphate mono-esters of a mixture of higher fatty alcohols. This wetting agent or so-called "soap solution" is preferably a 1% solution although this value may be increased or decreased somewhat as circumstances may require.

As stated above, the binder is also placed in the mixer and during the mixing operation the binder becomes thoroughly distributed among the fibers. The binder should be either in a powdered or granular form, and the grains or particles should not be of a larger size than that corresponding with a 35 mesh screen. Any one of the binders above mentioned may be used, but I prefer to use the natural asphalt known as gilsonite which is insoluble in water. The amount of binder to be used should be relatively small, as mentioned above, so as not to decrease the absorbent properties of the matted fibers. I find that the use of 10% to 20% by weight of the binder gives good results although the amount used can be varied somewhat and can be more or less than the percentage mentioned.

The mixing operation need be continued only a few minutes, but the mixing period will depend on the speed of the mixer, its size, and the amount and character of the material being treated, as well as various other factors. The temperature of the wetting agent or soap solution will also affect the period of mixing because a higher temperature will increase the speed at which the foam is produced during the mixing.

Following the treatment of the bark fibers in the mixer, the wetting agent or soap solution is removed from the fibers, preferably by placing the material on a screen and withdrawing the wetting agent or soap solution through the screen by suction. Suitable apparatus for this purpose is represented in Fig. 2 wherein I show box 11 having a suction pipe 12 connected therewith and a screen 13 extending across the box and supporting a layer 14 of the mixed material. After the wetting agent or soap solution has been thus removed, the material is washed and as much as possible of the wash water removed therefrom.

In Fig. 2 I also show suitable apparatus for carrying out the washing of the material and the removal of the wash water. This apparatus may comprise a box 15 having a suction pipe 16 connected therewith and a screen 17 extending across the box and on which a layer 18 of the material is supported. A pipe 19 having a plurality of discharge openings discharges water onto the material at a point above the box 15. The water washes the material and removes the soap solution or wetting agent therefrom, and the wash water is itself removed from the material by the action of the suction in the box 15. The binder being insoluble in the wetting agent and wash water, remains in the material in a widely distributed condition throughout the fibrous mass.

The material is now transferred to a press such as the press 20 shown in Fig. 2 in which it is subjected to heat and pressure. As the material comes from the washing operation, it is in a more or less matted condition and is still damp or wet. Instead of placing the mat immediately in the press 20, it can, if desired, be placed on a hot plate while waiting for the pressing operation and during this interval of time some of the liquid would be evaporated from the material so as to shorten the time required for the pressing operation. Instead of using a press, the material might also be subjected to pressure between heated rolls. The pressure which is applied to the material compresses or molds the same into a sheet of a thickness suitable for battery separators. The heat which is applied to the material serves to dry the same by evaporating the moisture therefrom and also serves to soften the binder so that it will adhere to the fibers and hold them together. The gilsonite or natural asphalt which I have mentioned above as being a satisfactory binder has a relatively high melting point and thus permits a relatively high temperature to be used in the press which expedites the drying of the material. The temperature at which the material is heated should preferably be just below the melting point of the binder so that the binder will be softened but will not actually flow. I find that a temperature in the neighborhood of 335° or 340° F. is very satisfactory in the pressing and drying operation when gilsonite is used as the binder but this temperature may be increased or decreased with the use of different binders and as different conditions may require.

So far as I am aware, the feature of incorporating a binder in granular or powdered form in a mass of fibers and pressing or molding the mass while heated to a temperature which is below the melting point of the binder but which softens the binder to secure adhesion of the fibers, is broadly new and is applicable to the manufacture of various products other than storage battery separators. Moreover, this feature is applicable to other fibers than tree bark fibers; for example, it can be applied to the manufacture of battery separators, fiber board, and various other products from bagasse, cocoanut fibers, wood fibers, and other vegetable and mineral fibers.

When a press such as the press 20 is used for the pressing and drying operation, it may be of any suitable construction such as that shown in Fig. 2. As here illustrated, the press may comprise stationary and movable platens 22 and 23 between which a layer or mat 24 of the material is received. Steam or other suitable heating agent may be supplied to the platens by conduits 22a and 23a. A cylinder 25 incorporated in the base of the press is provided with a piston which is connected with the movable platen 23 by the piston rod 26 so that when the piston is actuated hydraulically or otherwise, the platens will subject the material to a desired pressure which may be in the neighborhood of 500 lbs. per square inch. The thickness of the sheet into which the matted material 24 is compressed or molded may be determined by the height or thickness of a suitable mold or mold ring 28 in which the material is placed.

The sheet obtained from the pressing and drying operation is then trimmed to the size and shape desired for the battery separator 10 and the trimmings resulting from this operation are salvaged and returned to the mixer.

As an example in the actual production of storage battery separators by the above-described process, 26 grams of tree bark fibers were mixed with 6½ grams of binder in 100 cubic centimeters of 1% soap solution, and when pressed into a sheet produced a battery separator 7" x 7" in size and having a thickness on the order of .090" to .095". I find that when a separator of these proportions is used in a storage battery in an available space of .142" between adjacent plates, the material of the separator has an apparent density of .274 after absorbing electrolyte and swells sufficiently to substantially fill the space between the plates.

From the foregoing description and the accompanying drawing it will now be readily understood that I have provided an improved storage battery separator which can be economically manufactured from wood bark fibers, such as the fibers of redwood bark which has heretofore been regarded more or less as waste material. Moreover, it can be stated that storage battery separators made from tree bark fibers have a long life and possess various other desirable characteristics.

While I have illustrated and described my improved battery separator and process, it will be understood, of course, that I do not wish to be limited to the particular article herein described in detail, but regard my invention as including such changes and modifications as do not constitute a departure from the spirit of the invention and the scope of the appended claims.

Having thus described my invention, I claim:

1. A battery separator comprising a sheet formed of matted tree bark fibers of the type having a relatively high lignin content.

2. A battery separator comprising a sheet formed of matted tree bark fibers of the kind having a relatively low cellulose content and a relatively high lignin content.

3. A battery separator comprising a sheet formed of matted redwood bark fibers.

4. A battery separator formed of matted tree bark fibers of the type having a relatively high lignin content and a binder.

5. A battery separator formed of matted tree bark fibers of the type having a relatively high lignin content and an asphalt binder.

6. A battery separator comprising a mat formed of redwood bark fibers and having asphalt incorporated therein as a binder.

EDWARD FAIRCLOUGH.